Oct. 24, 1939.　　　　C. RÄTH　　　　2,177,265
METHOD AND APPARATUS FOR REDUCING THE PRESSURE OF HIGH PRESSURE SYSTEMS
Filed Feb. 28, 1936
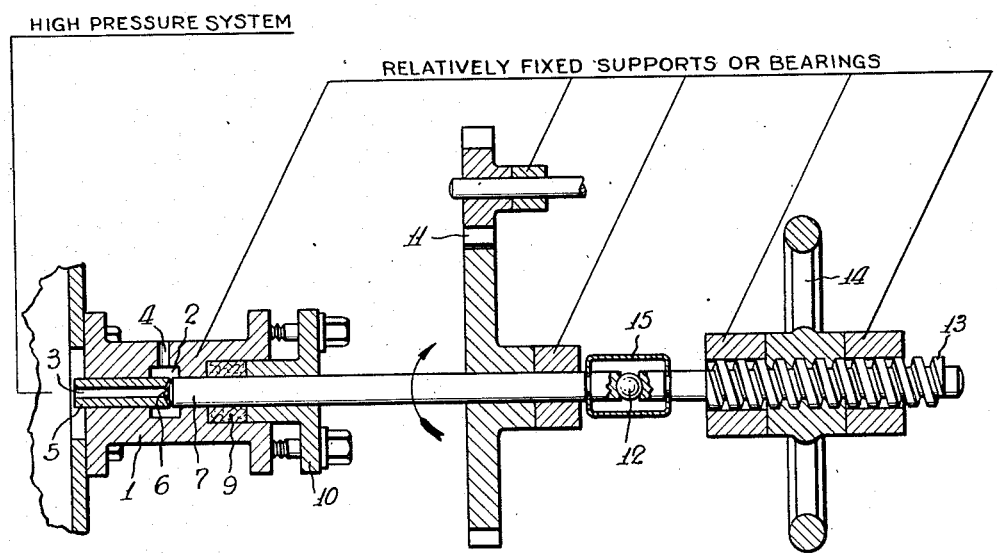
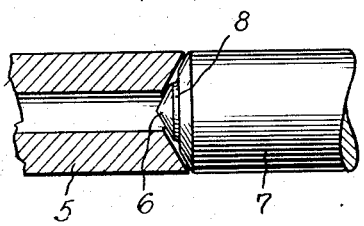
INVENTOR
Curt Räth
BY
ATTORNEY Patented Oct. 24, 1939

2,177,265

UNITED STATES PATENT OFFICE 2,177,265

METHOD AND APPARATUS FOR REDUCING THE PRESSURE OF HIGH PRESSURE SYSTEMS

Curt Räth, Radebeul, near Dresden, Germany, assignor to Chemische Fabrik von Heyden A. G., Radebeul, near Dresden, Germany, a corporation of Germany Application February 28, 1936, Serial No. 66,217
In Germany July 17, 1933

3 Claims. (Cl. 251—29)

This invention relates to a method and means for accurately controlling or reducing the high pressure of high pressure systems and it especially relates to a method for accurately controlling the high pressure of a continuous or semi-continuous liquid or vapor phase chemical reaction, and for accurately regulating and controlling the flow and the discharging of a liquid from a higher pressure to a lower pressure. Among such liquid phase processes are also those where the vapor pressure of the reaction material or reaction product at the temperature required is high above atmospheric pressure.

According to my invention, this essential regulation of the pressure and of the discharging of the liquid is obtained by a novel regulation valve which permits the pressure to be held at the desired point with a high degree of accuracy and security. Such regulation valve will work over a long period of time, while the liquid is continuously charged into or discharged from the apparatus.

The following manufacturing operations are axamples of the types of operation wherein the application of this invention is of value: reducing the pressure of mineral-oil-springs, hydrolysis, amonolysis, hydrogenation and oxidation. A further example is the continuous hydrolysis of halogen substituted or sulfonated aromatic hydrocarbons to their corresponding phenols. In this process the initial materials are reacted with water or strong or weak alkalis at high temperatures, the high pressure being necessary to maintain the liquid phase at this temperature.

In a like manner, by treating halogen substituted aromatic hydrocarbons with ammonia at an elevated temperature, the corresponding amines are formed. Again the accurate regulation of the pressure corresponding to the desired temperature is essential.

Difficulties were encountered in the prior art in continuously and with a desired precision, stepping down from a higher to a lower pressure, which step might involve evaporation of part of the mixture. Such difficulties became very serious when the difference between the initial and final pressures was considerable, when the materials were hot, when they were highly corrosive, or when solids were suspended in the liquids which acted to destroy the cocks or valves and the seats thereof. These difficulties caused particular inconvenience, when the pressure of only a comparatively small stream of the fluids was continuously reduced.

Replacement of the cocks or valves is troublesome and uneconomical and entails interruption of a continuous process. Multiple arrangements, which provide a plurality of reducing valves in parallelism for alternative use, require at least one pair of cocks in connection with each reducing valve in order to facilitate orderly switching.

The difficulties of a process of this kind are apparent from the many complicated devices which have been developed in order to obtain a predetermined pressure in the apparatus, e. g. United States Patents No. 1,213,143, No. 1,213,142, No. 1,602,766, No. 1833,485; or in order to cut down the pressure by friction (see United States Patent No. 1,783,163). Such devices and processes of the prior art may decrease, but do not overcome the first described difficulties.

According to my invention, the reduction of the pressure of a mixture may readily be brought about by a reducing valve, and may be controlled within any pressure range by providing for continuous relative motion of the valve and the valve seat in the pressure reducing means, and independent of any change in the adjustment of the valve relatively to the valve seat.

Further I must provide a valve which is not a needle with a long tapered end and a valve seat with a small diameter of the opening, because such a valve is soon clogged by dirt or other matter held in suspension in the fluid. That is avoided by making the valve with a flat cone having a broad surface so that the seat of the valve may have a wide bore.

Finally the valve is so constructed that it coacts with the inlet port of the valve chamber. The valve chamber and the packing for the valve stem and the construction for the bearing of the rotating system for the valve stem are situated on the side of the lower pressure of the valve device. That is the reason why the valve can be made more simple and economical.

One form of such apparatus is illustrated by the accompanying drawing. Nothing novel is provided in respect to the high pressure apparatus per se, the drawing showing only the means for facilitating the change of high pressure of the reaction mixture to comparatively low or atmospheric pressure.

In the accompanying drawing I show a construction of the pressure reducing device. Fig. 1 is a cross-sectional view of the complete device, Fig. 2 is an enlarged sectional view of the valve seat and the cone.

Throughout the two figures, similar reference characters will be used to refer to similar parts.

My pressure reducing device comprises a body member 1 having a valve chamber 2 formed therein which is provided with an inlet port 3 and an outlet port 4. The inlet port 3 is provided with the valve seat 5, the inner end of which is bored with nearly the same slope as the cone 6 on the valve stem 7. The cone 6 may be provided with a groove 8. Escape of liquid along the stem 7 is prevented by the packing 9 which is compressed by the bushing 10. The stem 7 is rotated by a rotating device 11 which can be driven from any suitable source of power. The bearing ball 12 carried by the inner end of the screw 13 will push the valve stem 7 and consequently the cone 6 down towards the valve seat 5 when the screw 13 is adjusted toward the end of the valve stem by the wheel 14. By reverse movement of the wheel 14 and the screw 13 the stem is lifted by the member 15. In this way it is possible to adjust accurately the distance between the cone 6 and the seat 5 and hold them in definite spaced relationship independent of the rotary movement.

The advantages of these improvements are manifold; whereas in the pressure reducing means of the prior art the solids carried along, like rust particles or other deposits from the apparatus, resinous by-products, etc., obstructed and clogged the valve passage proper, such particles and solids are ground up, rolled or thrown out by the rotation of the opposed valve parts and are washed away by the fluid. Unevenness of the cone or seat of the valve due to corrosion will also be overcome by the relative grinding action of the cone and seat. Therefore the valve for a long time will allow the passage of a uniform stream of even minute quantities of fluids, and experience has shown that the screw 13 has to be regulated only at long intervals. Therefore the processes which require high pressure in a pressure apparatus equipped in the manner described will run extremely smoothly and evenly, at the same time eliminating all danger.

It is understood that the improved system of this invention may be adapted to any liquid phase process or any chemical reaction at elevated pressure and operated continuously or semi-continuously, where accurate pressure control per se is essential.

While I have described many details of construction, it is to be clearly understood that my invention is not limited to these details but is capable of other adaptions and modifications within the scope of the appended claims.

What I claim is:

1. The combination with a high pressure system, of pressure reducing means comprising complementary valve parts with substantially coextensive and substantially parallel conical faces, one of said valve parts having an orifice, means for delivering high pressure fluid from said system through said orifice against the other part and thence between said faces, means for continuously rotating the last mentioned valve part in respect to the apertured one, and a screw for adjusting said rotatable valve part toward and from the other and holding it in predetermined spaced relationship therefrom during said rotation and independent of variations in pressure in said system.

2. The combination with a high pressure system, of a pressure reducing means comprising complementary valve parts with substantially parallel surfaces, one of said valve parts having an orifice, means for delivering high pressure fluid from the system through said orifice against the other valve part and thence substantially radially between said surfaces, means for continuously moving said last mentioned valve part in respect to the other without varying the spacing between said valve parts, and means for positively moving said rotatable valve part to a predetermined distance from the other independent of said rotary movement, and to provide a fixed spacing therebetween which is independent of variations in pressure in said system.

3. The method of controlling the pressure of high pressure systems containing a high pressure fluid, and discharging said high pressure fluid, which method comprises delivering the high pressure fluid through an orifice directly against the end of a closure member acting to deflect the fluid and permit its expansion and drop in pressure in a conical stream between annular substantially parallel walls, continuously rotating said closure member in respect to the other to free the space between said walls of any solid particles, and controlling the rate of flow and expansion by adjusting the closure member to a fixed predetermined distance from the wall of said orifice and positively holding said closure member at said distance independent of said rotation and any variations in pressure in said system.

CURT RÄTH.